Dec. 15, 1953 R. F. WITTERS 2,662,998

ELECTRIC MOTOR CONTROL FOR SHAFT POSITIONING SYSTEMS

Filed Jan. 5, 1951 2 Sheets-Sheet 1

INVENTOR.
ROBERT F. WITTERS
BY
Marvin Moody
ATTORNEY

Dec. 15, 1953 R. F. WITTERS 2,662,998
ELECTRIC MOTOR CONTROL FOR SHAFT POSITIONING SYSTEMS
Filed Jan. 5, 1951 2 Sheets-Sheet 2

INVENTOR.
BY ROBERT F. WITTERS
Marvin Moody
ATTORNEY

Patented Dec. 15, 1953

2,662,998

UNITED STATES PATENT OFFICE 2,662,998

ELECTRIC MOTOR CONTROL FOR SHAFT POSITIONING SYSTEMS

Robert F. Witters, Cedar Rapids, Iowa, assignor to Collins Radio Company, Cedar Rapids, Iowa, a corporation of Iowa Application January 5, 1951, Serial No. 204,672

7 Claims. (Cl. 318—33)

This invention relates to a control apparatus and will be explained as a control device for electrical equipment. It is to be understood, of course, that the principles of the invention are not to be limited by this example of a particular use.

In radio receivers it is oftentimes desirable to have a constant intermediate frequency stage and this requires a variable oscillator in the receiver which may be adjusted so that the resulting beat with the incoming signal will remain at a constant frequency. As the local oscillator is varied over its frequency range it is oftentimes desirable to change the components in the radio frequency section of the receiver to tune it to the incoming signal. Thus, it is desirable to gang the local oscillator and the tuning elements in the radio frequency section together.

It is an object of this invention, therefore, to provide control means for tuning elements in the radio frequency section of a receiver which automatically adjusts them to the correct position corresponding to the setting of a local oscillator control shaft.

Another object of this invention is to provide a control circuit which controls a tracking device and which will prevent "hunting" of the tracking device.

Yet another object of this invention is to provide an anti-hunting control device.

A feature of this invention is found in the provision for a control means and a controlled means which has anti-hunting characteristics.

Further objects, features and advantages of this invention will become apparent from the following description and claims when read in view of the drawings, in which:

Figure 1:
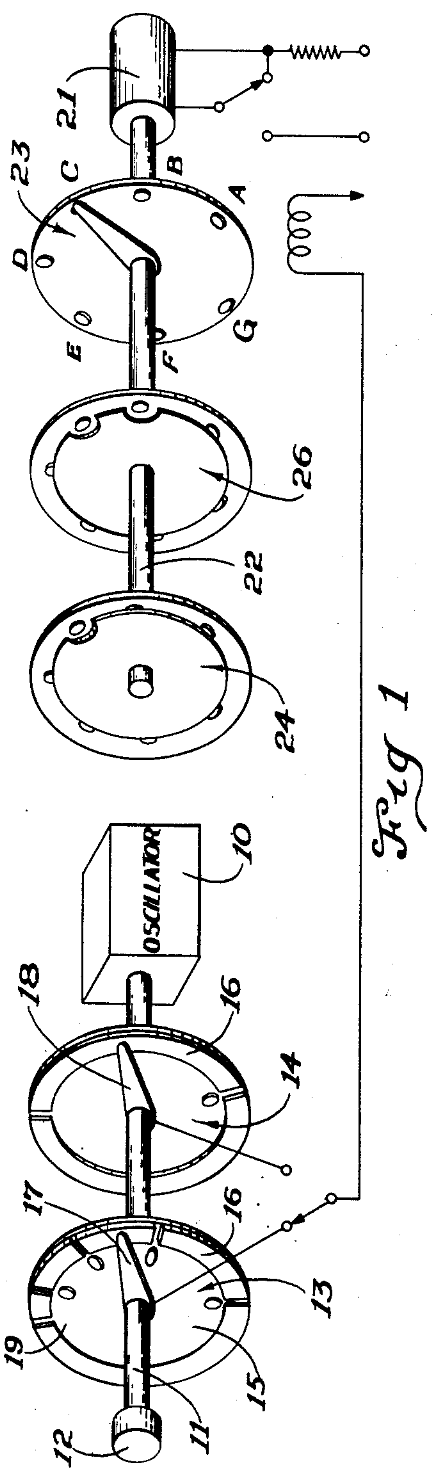
Figure 1 is a schematic drawing of the control and controlled apparatus of this invention.

Referring to Figure 1, an oscillator 10 has a frequency control shaft 11 and a control knob 12 is connected to its free end. A pair of switches 13 and 14 are mounted on the shaft 11. The switch 13 comprises a circular disc of insulating material 15 and a plurality of conducting segments 16 mounted about its periphery. The segments 16 are insulated and separated from each other and a slide contact 17 is connected to the shaft 11 and is movable by the knob 12 to engage the various segments 16. The disc 14 and the segments 16 do not rotate with the shaft 11.

The switch 14 is similar to the switch 13 except that the switch 14 has a smaller number of segments 16 about its periphery. A slide contact 18 engages the segments of the switch 14 and is movable with the shaft 11. Between the segments 16 of the switches 13 and 14 are mounted conducting pins 19 which are engageable with the contacts 17 and 18, respectively, when they are between the segments 16. It is to be understood that the width of the contacts 17 and 18 are such that when they pass from adjacent segments 16 they never touch more than one.

The purpose of the switches 13 and 14 is to allow the oscillator 10 to be tuned over a high and low frequency range with the switch 13 corresponding to the low frequency range and the switch 14 corresponding to the high frequency range. In the low frequency range the first harmonic of the oscillator output is used and in the high frequency range the second harmonic of the oscillator is used. For example, if it is desired to obtain an output from the oscillator 10 over the range from 15 to 1,000 kilocycles, the low range might extend from 15 to 500 kilocycles and the high band from 500 to 1,000 kilocycles. It is seen that when the second harmonic is used in the high band that the low band will be retraced by the oscillator. However, the second harmonic of the output will be used instead of the first harmonic.

In a radio receiver wherein the oscillator 10 is used as a local oscillator to obtain a constant intermediate-frequency, components in the radio-frequency section of the receiver must be changed as the incoming signal varies over a wide range. Particular components of the radio-frequency section will be good over a particular frequency increment so that once they are chosen they need not be changed until their range is covered. Thus, step tuning of the radio frequency section may be used.

Therefore, control switches 13 and 14 are electrically connected to a motor 21 which has mounted on its output shaft 22 a controlled or selector switch 23 and motor controlling switches 24 and 26. The switch 23 is step tunable to a plurality of positions with these positions corresponding to the various radio-frequency components which must be connected in the receiver input. The controlled switch 23, for example, is movable through positions *a* through *g* and in each position a different coil will be connected in the radio-frequency section.

Figure 3:
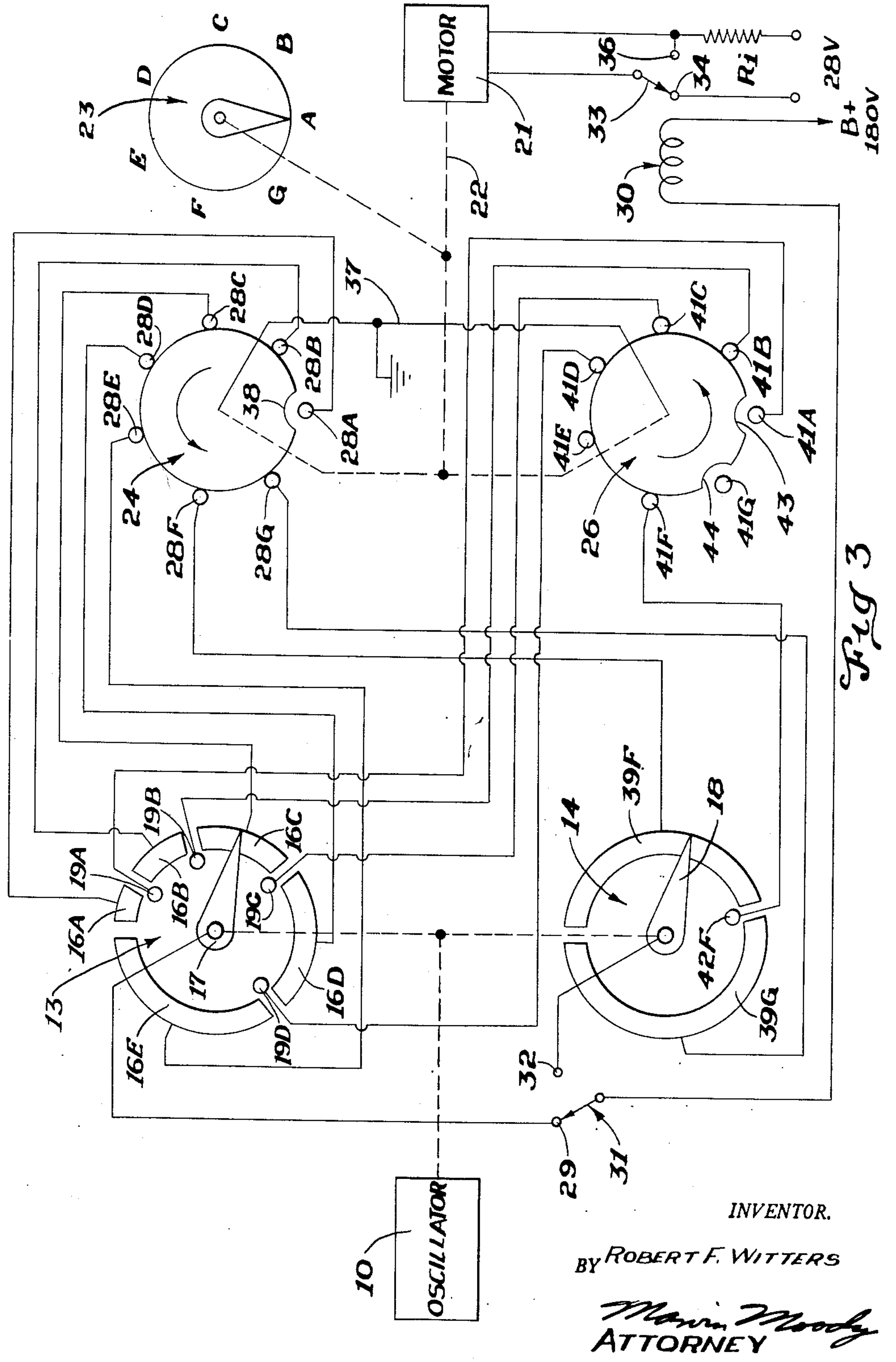
Figure 3 is a detailed schematic drawing of the control and controlling apparatus of this invention.

The switches 24 and 26 are motor control switches and track the controlling switches 13 and 14. Figure 3 illustrates in greater detail the electrical connections between the controlling switches 13 and 14 and the motor controlling switches 24 and 26.

Figure 2:
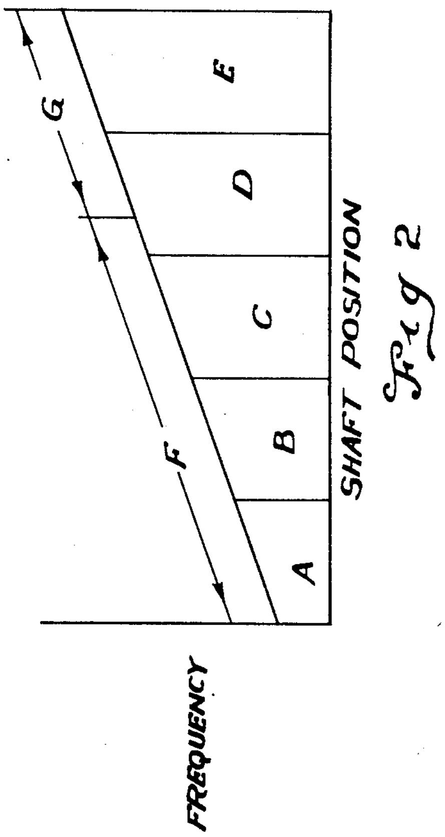
Figure 2 is a graph illustrating a control problem.

Figure 2 illustrates the relationship between frequency output of the oscillator 10 and its shaft position. It is to be noted that the shaft position $\theta$ increases with frequency. Over the lowest frequency range, A, the switch 23 will be at position A with the corresponding coil and components for the radio-frequency section of the receiver connected. The switch 13 will be the control switch and the segment 16*a* will be engaged by contact 17. As the angle $\theta$ is increased by rotation of the knob 12 the second portion, 2, of the curve will be entered and the contact 17 will pass from segment 16*a* to segment 16*b*. This causes the switch 23 to move to its second position B where the components of the radio-frequency section will be changed to correspond to the new position. After the contact 17 has been rotated through its five segments the selector switch 23 will be in the fifth position with the corresponding components connected in the radio-frequency section. In order to reach a higher frequency, the operator must change from the low to the high range thus connecting his electrical control circuit from switch 13 to switch 14. If the contact 17 is in its uppermost frequency position when this change is made then the operator will have switched to an intermediate position of the high range and thus may tune up or down the band to reach any desired position between the top of the low range and the top of the high range.

Referring to Figure 3, the segment 16*a* of switch 13 is electrically connected to a contact 28*a* adjacent the motor control switch 24. Likewise, segment 16*b* is connected to a contact 28*b*, and so forth, so that there is a contact 28 corresponding to each segment of the switch 13.

The oscillator 10 is mechanically connected to the contact 17 of the switch 13 and the contact 17 is electrically connected to a terminal 29. A two-position switch 31 is movable between terminals 29 and 32. Contact 32 is connected to contact 18 of switch 14. Switch 31 is connected to one side of a relay 30. The opposite side is connected to a positive voltage B+.

The relay 30 controls a movable switch 33 which moves between terminals 34 and 36. The terminal 34 is connected to one side of a voltage supply as, for example, 28 volts, and the switch 33 is connected to the motor 21. The other side of the motor 21 is connected to contact 36 and a resistor $R_1$. The other side of the resistor $R_1$ is connected to the opposite side of the motor-operating voltage. Thus, when the relay 30 is energized the switch 33 moves to engage the contact 34, thus connecting the motor to the 28 volts supply so that it rotates until the relay 30 is de-energized. When this occurs the switch 33 moves to engage contact 36, thus shorting the armature of the motor and dynamically breaking the motor to a standstill.

The motor-control switches 24 and 26 are grounded by lead 37 and the switch 24 is formed with a cutaway portion 38 which prevents any of the contacts 28 from touching the switch 24 when the particular contact is radially aligned with the opening 38. Thus, as shown in Figure 3, the portion 38 is adjacent the contact 28*a* and since the contact 17 of switch 13 engages segment 16*c*, the relay 30 will be energized and the motor 21 will run and drive the switch 24 and selector 23 until the portion 38 is adjacent the contact 28*c*. It is seen that the relay circuit is completed from ground through the lead 37 to the switch 24, hence from contact 28*c* to segment 16*c*, then through the contact 17 and the switch 31 to the energizing voltage of the relay 30.

When the switch 24 is moved by the motor 21, the relay circuit will be broken when the portion 38 is adjacent the contact 28*c*. The switch 24 will not move as long as the contact 17 engages the segment 16 electrically connected to the contact 28 adjacent the portion 38. Thus the switch 23 will remain in its C position until the contact 17 engages segment 16*b* or 16*d*. The radio frequency components controlled by the switch 23 are chosen so as to overlap slightly so that as the oscillator moves the short distance between segments the radio frequency components will still be good. It is seen that the switch 13 controls the A, B, C, D and E positions of motor control switch 24 and selector switch 23.

The switch 14 controls the F and G positions of motor control switch 24 and selector switch 23. When it is desirable to change to the high frequency position the switch 31 is moved to engage the contact 32, thus connecting switch 14 into the motor control circuit while disconnecting switch 13. Switch 14 is formed with two segments 39*f* and 39*g* which are engageable by contact 18. The segment 39*f* is electrically connected to a contact 28*f* adjacent switch 24 and the segment 39*g* is electrically connected to contact 28*g* of switch 24. Thus, the motor control circuit comprises the lead 37 from ground to the switch 24, hence through the contacts 28*f* or 28*g* to segments 39*f* or 39*g*, through contact 18 to the switch 31 and to the relay 30. If the contact 18 engages segment 39*f* the motor 21 will run until the portion 38 is adjacent contact 28*f*. Selector switch 23 will then be in the F position with the corresponding radio frequency components connected.

It is to be understood that the second harmonic of oscillator 10 is being used when the switch 31 is moved to engage contact 32 and for this reason the switch 14 retraces the angular positions of the switch 13. However, because the switch 13 has been disconnected by the switch 31, only the switch 14 will control.

It is to be noted that if the apparatus was operating in the high frequency position and then switched to the low frequency position by moving the switch 31 from contact 32 to 29, it would be possible for the contact 17 to not touch any segments 16, and thus, the previously explained operation would not occur. This is true because there would be no completed motor control circuit to the contact 17 from the segment 16. Therefore, the contacts 19 are placed between each segment 16 and are electrically connected to contacts on the second motor control switch 26. The contact between segments 16*a* and 16*b* is designated as 19*a* and is electrically connected to contact 41*a* adjacent switch 26. Likewise, contact 19*b* is between segments 16*b* and 16*c* and is connected to contact 41*b* of switch 26. There is no contact 19 between segments 16*e* and 16*a*, and contact 41*e* is not connected to the switch 13. The switch 14 has a contact 42*f* between segments 39*f* and 39*g* which is connected to contact 41*f* of switch 26. Contact 41*g* is not connected to switch 14. The switch 14 is made of conducting material and is formed with two arcuate portions 43 and 44 which are adjacent each other so as to disconnect adjoining contacts 41 from the switch 26. The switch 26 is grounded by the lead 37.

Thus, it is seen that the contacts 19a through 19d and 42f prevent a null position from being obtained when the switch 31 is moved from contact 29 to 32, or vice versa. The arcuate portions 43 and 44 are formed in the switch 26 so that it is inoperative as long as the contacts 17 or 18 are merely being moved from adjacent segments. Since the switches may be rotated clockwise or counterclockwise it requires two open circuit positions for satisfactory operation. The switch 26 is mechanically connected to the switch 24 and moves with it. Thus, the arcuate portions 43 and 44 will present open circuits during change from adjacent segments on either switches 13 and 14. It is only when a change is made from the high to low, or low to high positions that a circuit might be completed through switch 26. The circuit will be completed through switch 26 then only if the contact 17 or 18 which is connected falls between segments 16 or 39.

It is seen that this invention provides a control circuit which has anti-null features and step controls a plurality of elements in response to a continually movable control switch.

Although the invention has been described with respect to preferred embodiments thereof, it is not to be so limited as changes and modifications may be made therein which are within the full intended scope of the invention as defined by the appended claims.

I claim:

1. Anti-null apparatus for preventing a null position being obtained while switching from a first to a second control switch formed with a plurality of segments about their periphery and a rotary contact engageable therewith and said contacts being narrower than the distance between adjacent segments comprising, a plurality of contacts between said segments engageable by said rotary contacts when they are between segments, a motor control circuit comprising a pair of motor control switches and having a plurality of peripherally engaging contacts adjacent thereof with each contact adjacent the first of said motor control switches electrically connected to a segment on the first and second control switches, each of said peripheral contacts on said second motor control switch electrically connected to the contacts between segments on said first and second control switches, and said motor control circuit connected to the rotary contact of the first or second control switch.

2. A control circuit comprising first and second control switches formed with a plurality of segments about their periphery and a contact between adjoining segments, and a rotary contact engageable with said contacts and segments, first and second motor control switches with a plurality of contacts engageable therewith, the contacts engageable with said first motor control switch connected to the segments of said first and second control switches, the contacts engageable with said second motor control switch connected to the contacts between adjoining segments of the first and second control switches, a control means connected to the rotary contacts of said first and second control switches, driving means mechanically connected to first and second motor control switches, said first motor control switch formed with an open circuit position, said second motor control switch formed with a pair of adjacent open circuit positions, a selector switch connectible to the rotary contacts of said first or second control switches, motor actuating means connected to said selector switch and connecting and disconnecting the motor to a power supply in response to actuation of the controlled and motor control switches.

3. Control apparatus comprising, a pair of control switches each of which have rotary contacts that are mechanically connected together, a plurality of segments mounted about the peripheries of each of said control switches, a contact mounted between each pair of said segments, the rotary contacts of said switches engageable, respectively, with a frequency range switch, motor control means connected to said frequency range switch, a pair of motor control switches mechanically connected to said motor and formed with a plurality of contacts about their peripheries, the contacts about the periphery of the first motor control switch connected to the segments on the first and second control switches, the contacts about said second motor control switch connected to the contacts between the segments of said first and second control switches, a selector means mechanically connected to said motor, and said motor control switches connected to ground.

4. Means for preventing a null position being obtained while switching a control apparatus from a high to a low frequency position comprising, a high frequency control switch and a low frequency control switch, each having a plurality of segments about their peripheries and a rotary contact engageable therewith, and a contact between each pair of said segments, a selector switch engageable with the rotary contact of said high or low frequency control switch, motor actuating means connected to said selector switch, a pair of motor control switches, a motor mechanically connected to said motor control switches, a plurality of contacts about the peripheries of said motor control switches with said contacts about the first motor control switch connected to the segments of the first and second control switches, and the contacts about the periphery of the second motor control switch connected to the contacts between segments of the first and second control switches, said motor control switches connected to ground, the rotary contacts of said control switches mechanically connected together, and controlled apparatus mechanically connected to said motor.

5. Control apparatus which can not be placed in a null position comprising, a pair of control switches which have rotary contacts mechanically connected together, a motor control circuit connectible respectively to one of said rotary contacts, a plurality of segments about each of said control switches, a plurality of contacts between segments of said control switches, a motor mechanically connected to control apparatus, a pair of motor control switches mechanically connected to said motor, a plurality of contacts about the first motor control switch with each contact electrically connected to a segment about the first and second control switches, a plurality of contacts about the second motor control switch with each contact electrically connected to the contacts mounted between segments on said first and second control switches, said first motor control switch formed with an arcuate portion, said second motor control switch formed with a pair of adjacent arcuate portions, and said first and second motor control switches connected to ground.

6. Control apparatus comprising, a pair of control switches which have a rotary contact mounted on each, said rotary contacts mechanically connected together, a selector switch movable to engage one of said rotary contacts, a motor control circuit connected to said selector switch, a motor mechanically connected to controlled apparatus, a pair of motor control switches mechanically connected to said motor, a plurality of segments about the peripheries of the first and second control switches and electrically connected to contacts mounted about the periphery of the first motor control switch, a plurality of contacts mounted between segments of the first and second control switches and connected to contacts mounted about the periphery of the second motor control switch, said motor control switches connected to ground, said first motor control switch formed with an arcuate portion in its periphery, and said second motor control switch formed with a pair of adjacent arcuate portions in its periphery.

7. An anti-null control apparatus comprising, a pair of control switches, a pair of motor control switches, a motor mechanically connected to said motor control switches and controlled apparatus, motor actuating means connected to said control switches, said control switches electrically connected to said motor control switches, a plurality of segments about the first and second control switches, a plurality of contacts about the first motor control switch with each contact connected to a segment about the control switches, a plurality of contacts between the segments of the control switches and a plurality of contacts about the second motor control switch connected to the contacts between segments, and rotary contacts on the first and second control switches mechanically connected together and connectible to the motor actuating means.

ROBERT F. WITTERS.

References Cited in the file of this patent

UNITED STATES PATENTS

| Number | Name | Date |
|---|---|---|
| 2,210,426 | Noack | Aug. 6, 1940 |
| 2,420,026 | Yardeny | May 6, 1947 |
| 2,442,739 | Yardeny | June 1, 1948 |
| 2,455,901 | Yardeny | Dec. 7, 1948 |
| 2,475,217 | Bernas | July 5, 1949 |
| 2,493,844 | Yardeny | Jan. 10, 1950 |
| 2,553,069 | Unk et al. | May 15, 1951 |